(No Model.)
A. H. JOHNSON.
DETECTOR BAR.
No. 416,921. Patented Dec. 10, 1889.
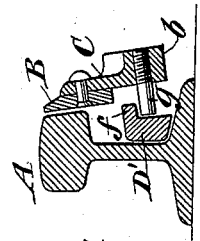
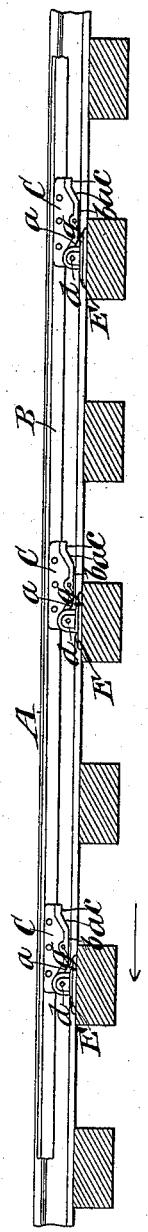
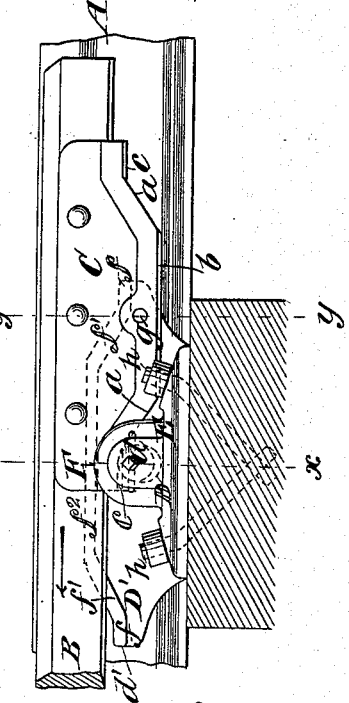
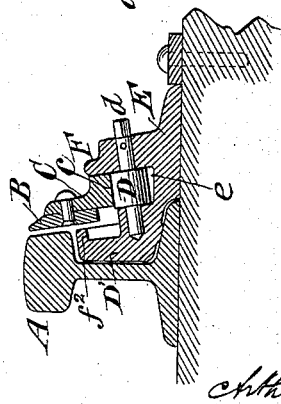
Witnesses:
C. E. Sundgren
John Bicker
Inventor:
Arthur H. Johnson
By attorneys
Brown & Griswold

UNITED STATES PATENT OFFICE.

ARTHUR H. JOHNSON, OF RAHWAY, NEW JERSEY.

DETECTOR-BAR.

SPECIFICATION forming part of Letters Patent No. 416,921, dated December 10, 1889.

Application filed February 21, 1889. Serial No. 300,702. (No model.)

*To all whom it may concern:*

Be it known that I, ARTHUR H. JOHNSON, of Rahway, in the county of Union and State of New Jersey, have invented a certain new and useful Improvement in Dectector-Bars, of which the following is a specification.

My improvement relates to so-called "detector-bars" which are employed to detect the presence of a car or cars upon a railway-track. I will describe in detail a detector-bar embodying my improvement, and then point out the novel features in claims.

In the accompanying drawings, Figure 1 is a side elevation of a portion of a railway-rail and a detector-bar embodying my improvement. Fig. 2 is a similar view on an enlarged scale. Fig. 3 is a section taken on the line $x$ $x$, Fig. 2. Fig. 4 is a section taken on the line $y$ $y$, Fig. 2.

Similar letters of reference designate corresponding parts in all the figures.

A designates a railway-rail mounted upon ties, as usual.

B designates a detector-bar, which may be of any desired length and moved longitudinally in the usual or any desired manner. The detector-bar is provided upon its lower portion with horizontal surfaces $c$. Near its ends, inward of the horizontal surfaces $c$ and extending downwardly and inwardly, are oblique surfaces $a$. Intermediate of the oblique surfaces $a$ are horizontal surfaces $b$. As shown, these surfaces are formed upon plates C, which plates are riveted to the detector-bar; but they might be formed with the bar itself.

D designates rollers mounted upon shafts $d$, which shafts extend into suitable bearings in plates E. The plates E are secured, as here shown, by bolts $h$ to the railway-ties. These plates E comprise guards consisting of upwardly-projecting portions F, formed upon the plates near their outer sides. The shafts $d$ have one of their journals in said upwardly-projecting guards. The plates E are recessed, as at $e$, and the rollers D are arranged and rotate in said recesses. I have shown the rollers as arranged at a slight incline. When the detector-bar is at rest or in the positions shown in all the figures, the surfaces $c$ upon the detector-bar bear upon the rollers D, and thus support the detector-bar. The oblique arrangement of the rollers D causes the detector-bar to incline toward the rail. The parts occupying the positions shown, and it being desired to move the detector-bar in the direction of the arrow, longitudinal movement is imparted to it. It will then be caused to rise, because the bar will ride up along the roller, the latter bearing against the adjacent oblique surfaces $a$. If a car or cars should be detected on the track, of course the detector-bar cannot rise to its fullest height. If, however, no obstruction is met with, the bar may be moved along in a horizontal plane, as the surfaces $b$ will then be bearing upon the rollers. This movement will be essential when the bar is operated in connection with switch-operating mechanism. If not operated in conjunction with switch-operating mechanism, the bar may, after reaching its most elevated position, be at once lowered. If operated with switch-operating mechanism, after being moved along to the extremity of the surfaces $b$, the bar will then be lowered, because the other of the oblique surfaces $a$ will then bear upon the rollers, and when it has reached its lowest position the bar will be supported upon the other of its horizontal surfaces $c$, which will then bear upon the roller.

It will be observed that the plates E have rear portions D', which rear portions extend upwardly along the web of the rail. These portions are provided near their upper edges with bearing-surfaces, formed, as here shown, upon the under sides of flanges $d'$. These bearing-surfaces are of substantially the same length and shape as the bearing-surfaces $c, a,$ and $b$ upon the lower portion of the detector-bar, and comprise horizontal portions $f$, inwardly and upwardly extending oblique portions $f'$, and an intermediate horizontal portion $f^2$. It will be seen, therefore, that the arrangement of these surfaces is the reverse of that of the surfaces upon the detector-bar.

Upon the detector-bar and, as here shown, upon the plates C are pins or projections $g$, which extend inwardly and beneath the surfaces $f f' f^2$. When the bar is moved along, the pin or projection follows these surfaces, and therefore at all times operates to prevent the detector-bar from being lifted or otherwise moved too far upwardly. The guard portions F of the plate extend upwardly for a considerable distance outside the detector-bar or the plates C. These guards operate, in conjunction with the pins or projections $g$, to prevent the detector-bar from being moved sidewise out of position.

It will be seen that by my improvement means are provided for moving the detector-bar very easily and with but little friction, while at the same time it is not liable to be clogged or obstructed by snow, ice, or dirt.

What I claim as my invention, and desire to secure by Letters Patent, is—

1. The combination, with a railway-rail, of a detector-bar, rollers adjacent to the rail, plates upon which said rollers are mounted, provided with portions adjacent to the web of the rail having obliquely-extending surfaces, and pins or projections upon the lower portion of the detector-bar extending beneath said surfaces, said detector-bar being also provided upon its lower portion with obliquely-extending surfaces adapted to bear upon said rollers to raise and lower the detector-bar, substantially as specified.

2. The combination, with a railway-rail, of a detector-bar, rollers adjacent to the rail, plates upon which said rollers are mounted, and provided with portions adjacent to the web of the rail having obliquely-extending surfaces and horizontal surfaces intermediate of the obliquely-extending surfaces, and pins or projections upon the lower portion of the detector-bar extending beneath said surfaces, said detector-bar being also provided upon its lower portion with obliquely-extending surfaces adapted to bear upon said rollers to raise and lower the detector-bar, substantially as and for the purpose specified.

3. The combination, with a railway-rail, of a detector-bar, rollers adjacent to the rail, plates upon which said rollers are mounted, provided with portions adjacent to the web of the rail having obliquely-extending surfaces, and pins or projections upon the lower portion of the detector-bar extending beneath said surfaces, said detector-bar being also provided upon its lower portion with obliquely-extending surfaces adapted to bear upon said rollers to raise and lower the detector-bar, and said plates being also provided with guards, which, together with the said pins or projections, prevent the detector-bar from being moved sidewise out of position, substantially as specified.

ARTHUR H. JOHNSON.

Witnesses:
FREDK. HAYNES,
JOHN BICKET.